(12) United States Patent
Watanabe et al.

(10) Patent No.: US 6,438,634 B1
(45) Date of Patent: Aug. 20, 2002

(54) DATA PROCESSING SYSTEM INCLUDING APPARATUSES CONNECTED VIA A BIDIRECTIONAL BUS TO EACH OTHER AND DATA TRANSFER METHOD FOR USE WITH THE SAME

(75) Inventors: Satoru Watanabe; Takuya Iizuka, both of Hadano; Toshimitsu Ando, Isehara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/361,172

(22) Filed: Jul. 27, 1999

(30) Foreign Application Priority Data

Jul. 27, 1998 (JP) .............................. 10-210539

(51) Int. Cl.[7] .............................................. G06F 13/00
(52) U.S. Cl. ............................ 710/110; 710/31; 710/52
(58) Field of Search ................................. 710/110, 112, 710/102, 113, 119, 305, 309, 310, 31, 33, 52, 240, 39

(56) References Cited

U.S. PATENT DOCUMENTS 4,805,098 A * 2/1989 Mills, Jr. et al.
5,224,214 A * 6/1993 Rosich ........................ 710/39
5,517,660 A * 5/1996 Rosich ....................... 711/117

FOREIGN PATENT DOCUMENTS

JP 5257856 A * 10/1993

* cited by examiner

*Primary Examiner*—Peter Wong
*Assistant Examiner*—X. Chung-Trans
(74) *Attorney, Agent, or Firm*—Antonelli, Terry, Stout & Kraus, LLP

(57) ABSTRACT

In a system in which data transfer interfaces respectively of apparatuses are connected via a bidirectional bus to each other, the availability ratio of the bus is improved. An apparatus to issue read and write requests includes a write buffer to store write data and a bus changeover unit to monitor an operation status of the bus for a read data transfer. The apparatus immediately sends a read request via the bus to a communication partner and then receives read data via the bus from the partner. A write request and associated write data are once stored in the write buffer. When a predetermined number of write data is accumulated, a data transfer direction of the bus is changed if the bus is not being used by a read data transfer to successively transmit the write requests and write data thereof to the partner.

17 Claims, 5 Drawing Sheets

DATA PROCESSING SYSTEM INCLUDING APPARATUSES CONNECTED VIA A BIDIRECTIONAL BUS TO EACH OTHER AND DATA TRANSFER METHOD FOR USE WITH THE SAME

BACKGROUND OF THE INVENTION

The present invention relates to a system in which data transfer interfaces of mutually different apparatuses are connected via a bidirectional bus to each other and a data transfer method for use with the system, and in particular, to a data processing system and a data transfer method suitable for improving an availability ratio of the bidirectional bus.

Heretofore, there has been commonly known a data processing system in which data transfer interfaces of mutually different apparatuses A and B are connected to each other via a bidirectional bus commonly used to transmit and to receive signals. When mutually trans- ferring data between apparatuses A and B, a right of use or a bus mastership of the bus is granted for apparatus A or B depending on arrival of data therefrom at the bus.

In the system, for example, when apparatus A issues a data read request and a data write request to apparatus B, apparatus A transfers data related to the write request (write data) to apparatus B. On the other hand, apparatus A receives data associated with the read request (i.e., read data) from apparatus B. In the operation, apparatus B receives the write data from apparatus A. In response to the read request, apparatus B obtains data thus requested and transfers the data as read data to apparatus A. In consequence, there occurs a situation in which the read data and the write data alternately pass the bidirectional bus. Therefore, the data transfer direction of the bus between apparatuses A and B is frequently changed, which resultantly leads to an abrupt decrease in the bus availability ratio depending on cases.

SUMMARY OF THE INVENTION

In the conventional system described above, when read data and write data are transferred between apparatuses A and B via the bidirectional bus, there possibly occurs an event in which the data transfer direction of the bus is frequently altered. On such an occasion, the transfer direction change occupies most of the data transfer time and causes a problem of the abrupt decrease in the availability ratio of the bidirectional bus.

It is therefore an object of the present invention to minimize, in a system in which data is transferred via a bidirectional bus between mutually different apparatuses A and B, the number of transfer direction changes of the bus to decrease overhead of the transfer direction changes so as to improve the availability ratio of the bidirectional bus.

In accordance with the present invention, there is provided a data processing system in which data interfaces of at least two different apparatuses are connected via a bidirectional bus to each other, wherein an apparatus to issue a write request includes a write buffer in which a write request and write data of the write request are once stored. When a predetermined number of write requests and write data thereof are accumulated in the buffer, the write request issuing apparatus changes the transfer direction of the bidirectional bus to a write request transfer direction to successively transfer the plural write requests and write data thereof to associated communicating apparatuses. This reduces the number of transfer direction changes of the bus for the read and write data and hence improves the availability ratio of the bidirectional bus.

One of the apparatuses of the system includes a circuit to monitor a read data transfer status of the bidirectional bus. In a situation in which the number of write requests and the write data thereof in the write buffer is less than the predetermined value, when the monitor circuit detects a status that the bidirectional bus is not being used to transfer read data, i.e., the bus is available, the transfer direction of the bus is changed even if the write buffer contains only one write request and write data thereof. This also increases the availability ratio of the bidirectional bus.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
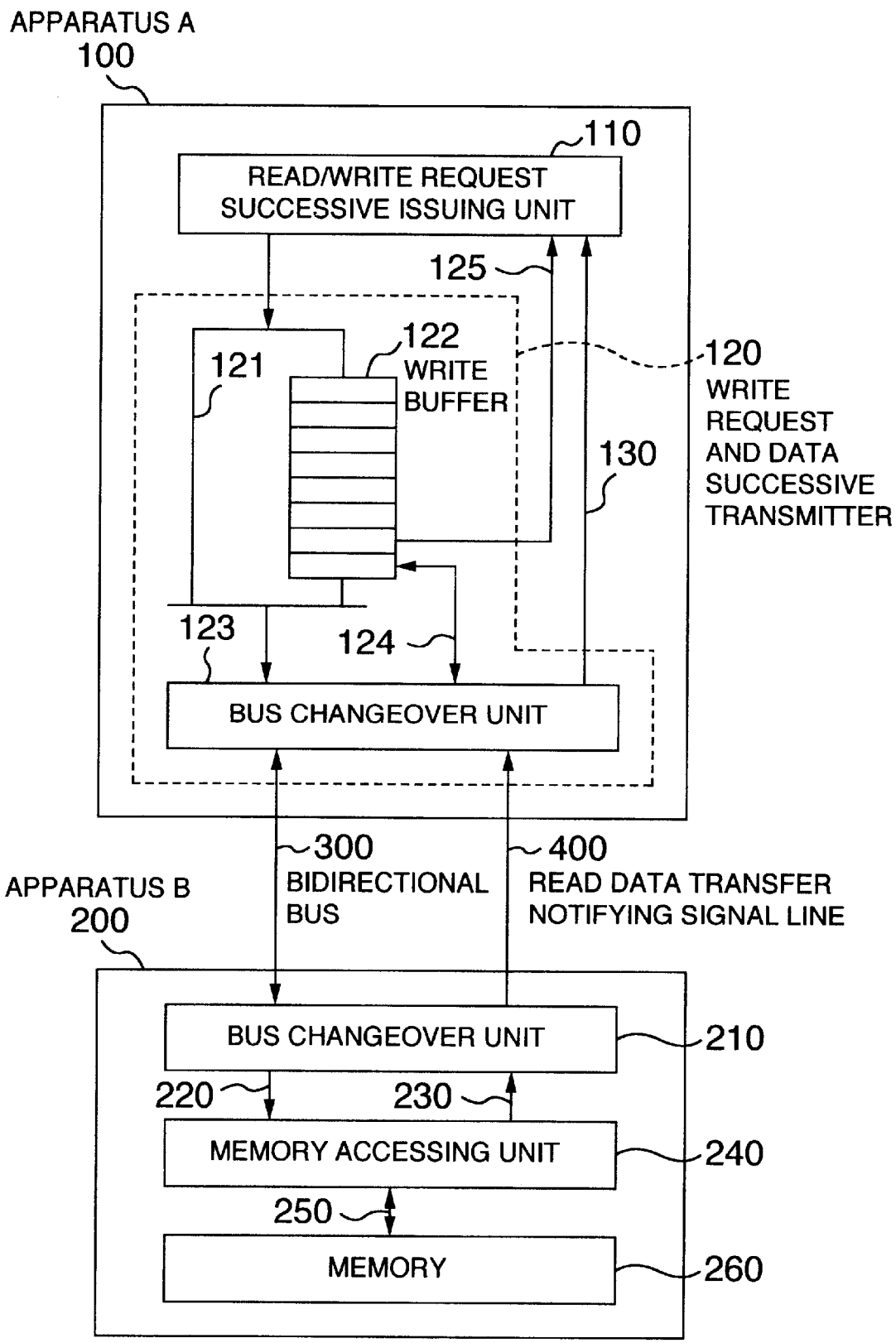
FIG. 1 is a block diagram showing an example of constitution of an embodiment of a data processing system in accordance with the present invention.

Referring now to the drawings, description will now be given in detail of an embodiment in accordance with the present invention.

FIG. 1 shows in a block diagram a system configuration example of the embodiment of the present invention.

The data processing system of FIG. 1 includes an apparatus A 100 and an apparatus B 200. Apparatus A 100 includes a read/write request issuing unit 110 such as a central processing unit (CPU) and a write request and data successive transmitter 120 connected to unit 110. Transmitter 120 includes a write buffer 122 and a bus changeover unit 123. On the other hand, apparatus B 200 includes a bus changeover unit 210, a memory accessing unit 240, and a memory 260.

Apparatuses A 100 and B 200 include respectively data transfer interfaces, which are connected via a bidirectional bus 300 to each other.

Bidirectional bus 300 includes a request line to transmit a read request or a write request, an address line to transmit an address associated with a read or write request, and a data line to transmit read or write data. Although bidirectional bus 300 includes the address and data lines as separated constituent components in this embodiment, these lines need not be separately arranged. In such a case, bidirectional bus 300 is configured to transmit the address and the data via a common data line.

When each of apparatuses A 100 and B 200 includes at least one large scale integrated (LSI) element, it is required to minimize interface lines between the LSI elements due to restrictions on size and the like. To satisfy such a requirement, it is efficient to connect the LSI elements via bidirectional bus 300 to each other.

The system of FIG. 1 includes a signal line to transmit a read data transfer notifying signal, which will be described later.

In apparatus A 100, when a read request is issued from read/write request issuing unit 110, the request and an associated address are sent via a group of signal lines 121 to bus changeover unit 123. For a read request, the read request and the address are transmitted through bus changeover unit 123 without delay via a request line and an address line of bus 300 to apparatus B 200.

In apparatus B 200, the read request and the address thus transmitted are received by bus changeover unit 210 to be sent therefrom via a group of signal lines 220 to memory accessing unit 240. In accordance with the read request and the address, memory accessing unit 240 accesses memory 260 via a group of signal lines 250 to acquire read data from memory 260. The read data is then fed via a signal line 230 to bus changeover unit 210.

The bus mastership of bus 300 is preferentially granted for the side of bus changeover unit 210. Therefore, the read data is sent through bus changeover unit 210 without any delay via the data line of bus 300 to bus changeover unit 123 of apparatus A 100. The read data is then transmitted via a signal line 130 to read/write request issuing unit 110, and then the operation of the read request is terminated.

In this system, bus changeover unit 123 of apparatus A 100 continuously monitors an operation status of bus 300 with respect to a read data transfer. This may be achieved, for example, as follows. An operation of the system in which apparatus A 100 issues a read request to apparatus B 200 to obtain read data can be assumed to be terminated in a predetermined number of machine cycles in accordance with operation (time) of memory 260. Namely, it can be considered that when a predetermined number of machine cycles lapse after the request is issued from apparatus A 100, read data from apparatus B 200 is received via bus 300. Consequently, if bus changeover unit 123 of apparatus A 100 keeps the number of read requests issued to apparatus B 200 and points of issuance time thereof, it is possible to monitor the usage or operation status of bus 300 associated with a read data transfer. Alternatively, at a point of time expressed in terms of a predetermined number of machine cycles before transferring read data to apparatus A 100, bus changeover unit 210 of apparatus B 200 sends a read data transfer notifying signal via a signal line 400 to bus changeover unit 123 of apparatus A 100. Namely, bus changeover unit 123 recognizes that the read data from apparatus B 200 will be received via bus 300 when a predetermined number of machine cycles lapse after the notifying signal is received. Therefore, bus changeover unit 123 can monitor the operation status of bus 300 related to a read data transfer.

Assume in the following description that bus changeover unit 123 monitors the operation status of bus 300 by the read data transfer notifying signal.

When read/write request issuing unit 110 of apparatus A 100 issues a write request, the write request, an associated address, and write data of the write request are once stored in write buffer 122. When a predetermined number of write data is stored in write buffer 122, write buffer 122 sends a request issuance suppressing instruction via a signal line 125 to read/write request issuing unit 110. Simultaneously, the event that the predetermined number of write data has been stored in write buffer 122 is notified from write buffer 122 via a signal line 124 to bus changeover unit 123. Since bus changeover unit 123 is continuously monitoring the operation status of bus 300 due to a read data transfer, when it is determined that bus 300 is not being used for a read data transfer, unit 123 sends a write data transmission grant signal via signal line 124 to write buffer 122. In response thereto, write buffer 122 transmits all write requests, addresses, and associated write data stored therein to bus changeover unit 123. Unit 123 acquires the bus mastership of bus 300 for a write data transfer and changes the data transfer direction to transfer write data. Receiving the plural write requests, addresses, and write data from write buffer 122, bus changeover unit 123 continuously transfers the received items via bus 300 to apparatus B 200. When the transfer operation is completely finished, bus changeover unit 123 releases the bus mastership of bus 300 and then alters the data transfer direction of bus 300 to transfer read data. Having received the write requests, addresses, and write data in a consecutive manner, bus changeover unit 210 of apparatus B 200 sequentially transmits these items via signal line group 220 to memory accessing unit 240. For each of a set including a write request, an address, and write data, memory accessing unit 240 issues a write access request to memory 260 using the write request and the address to store the write data in memory 260. When this operation is completely achieved by memory accessing unit 240 for all items received from apparatus A 100, the operation of the write request is terminated.

Figure 2:
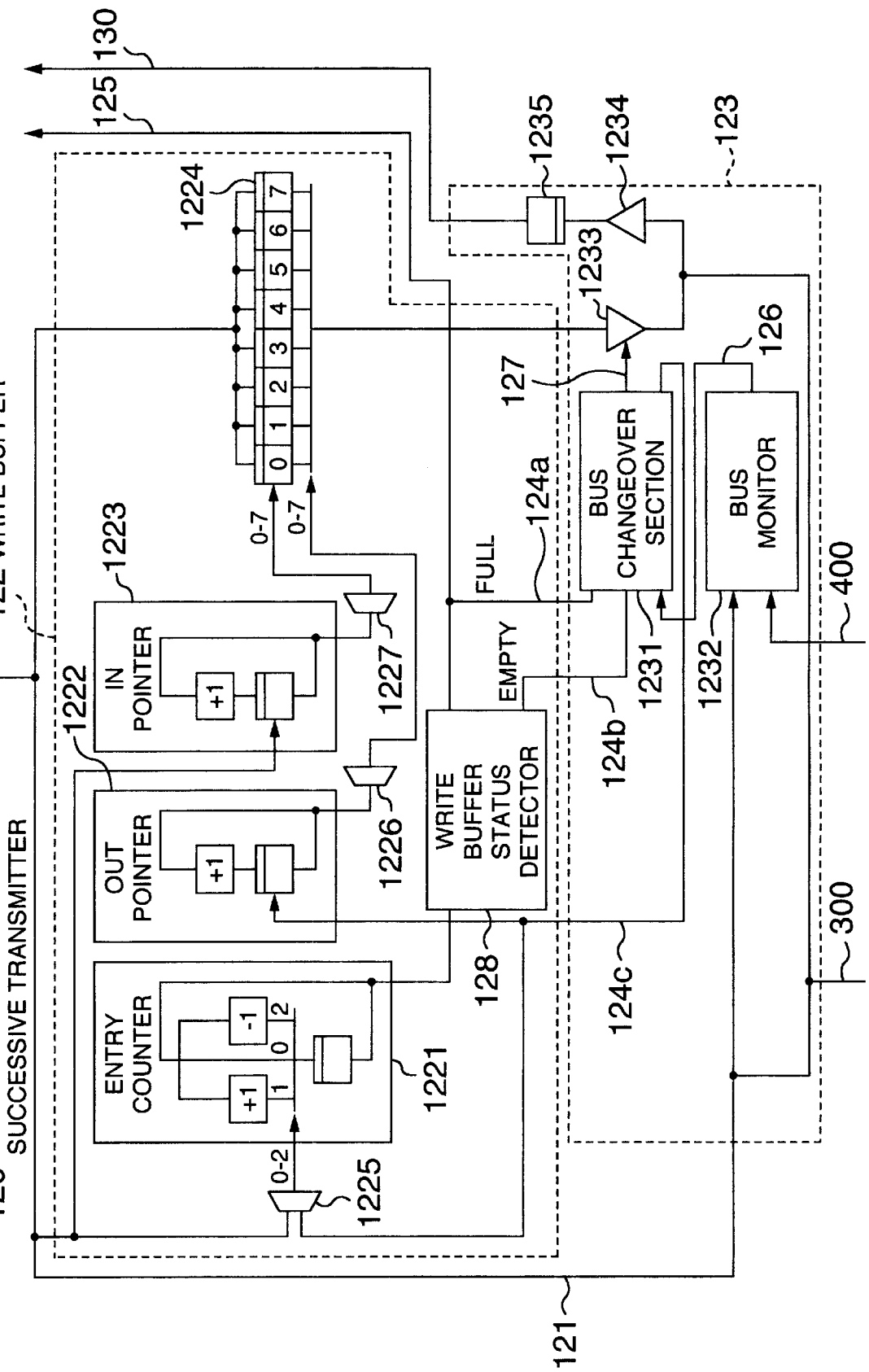
FIG. 2 is a diagram showing a concrete example of constitution of a write request and data successive transmitter in the data processing system of FIG. 1.

FIG. 2 shows a specific configuration example of write request and data successive transmitter 120 including write buffer 122 and bus changeover unit 123 of FIG. 1.

When read/write request issuing unit 110 sends a read request to write request and data successive transmitter 120, the read request and an associated address are transmitted via signal line group 121 to bus changeover unit 123. These items are than passed through bus changeover unit 123 without delay via bus 300 to apparatus B 200. At the same time, the read request is sent via signal line group 121 to a bus monitor unit 1232 of bus changeover unit 123. Bus monitor 1232 records an event of the transmission of a read request from changeover unit 123 to store historical information of bus 300. After changeover unit 123 issues a read request, a transfer notifying signal of read data associated with the read request is transmitted from apparatus B 200 via signal line 400 to monitor unit 1232. By receiving the notifying signal, monitor 1232 recognizes that read data will be received when a predetermined machine cycles lapse thereafter. After a lapse of the machine cycles, the read data from apparatus B 200 is received via bus 300. The data is received via a data reception driver 1234 by a data latch 1235 in changeover unit 123 and then is delivered via signal line 130 to read/write request issuing unit 110.

When request issuing unit 110 sends a write request, the write request, an associated address, and write data thereof are fed to write request and data successive transmitter 120. These items are stored in a write data buffer 1224 at a position indicated by an in pointer 1223, which will be described later. Although write data buffer 1224 includes eight planes in FIG. 2, the present invention is not restricted by this example.

Pointer 1223 includes a pointer value, which is decoded by a decoder 1227 to be sent to write data buffer 1224. In accordance with the value of pointer 1223, one of the eight planes of write data buffer 1224 is selected. The write request, the address, and the write data from request issuing unit 110 are delivered to write data buffer 1224 to be stored in the plane selected.

In concurrence with the storing operation of buffer 1224, the write request is sent to a latch in pointer 1223. On the other hand, the pointer value is incremented by a plus-one circuit, i.e., one is added to the pointer value and the result is sent to a latch of pointer 1223. When a write request is received by the latch, the resultant value is kept in the latch. Consequently, the pointer value of pointer 1223 indicates buffering position in buffer 1224 in which the write request and its associated write data are to be stored. When the pointer value of pointer 1223 is seven, the next pointer value becomes zero.

Moreover, the write request is concurrently transmitted also to a decoder 1225. When request issuing unit 110 issues a write request, decoder 1225 decodes the write request and sends the obtained item to a selector in an entry counter 1221. In the selector, the output from the plus-one circuit is selected according to the value decoded by decoder 1225 and is delivered to a latch in a lower stage.

In addition to the write request, a write data transmission grant signal from a bus changeover unit 1231, which will be described later, is also delivered to decoder 1225. Decoder 1225 decodes the received signal to produce, for example, "1" for a write request and "2" for a write data transmission grant signal. When none of these signals are received, decoder 1225 produces an output of "0".

The selector operates in accordance with the value outputted from decoder 1225. When the output value is "1", the output from the plus-one circuit of entry counter 1221, namely, a value obtained by adding one to the count value of entry counter 1221 is selected (i.e., plus-one selection). When the output value is "2", the output from a minus-one circuit of entry counter 1221, namely, a value obtained by subtracting one from the count value of entry counter 1221 is selected (i.e., minus-one selection). When the output value is "0", the current value of entry counter 1221 is directly selected (i.e., zero selection). The value selected is sent to be kept in a latch in a lower stage to indicate the next counter value.

As a result of the operations of decoder 1225 and the selector, entry counter 1221 indicates the current number of write data accumulated in write data buffer 1224.

Each time a write request, an address, and associated write data are sent from request issuing unit 110 to write request and data successive transmitter 120, the count value of entry counter 1221 and the pointer value of pointer 1223 are respectively updated in a sequential manner, and the write request, the address, and the associated write data are sequentially stored in write data buffer 1224. The count value from entry counter 1221 is sensed by a write buffer status detector 1228, which continuously monitors the operation status of buffer 1224. When buffer 1224 becomes full of data, namely, when eight planes of buffer 1224 are fully used in FIG. 2, the counter value of entry counter 1221 indicates "8". On detecting the counter value "8", detector 1228 sends a request suppression signal via a signal line 125 to request issuing unit 110, which accordingly suppresses issuance of a subsequent read or write request. Concurrently, detector 1228 transmits a full signal via a signal line 124a to bus changeover unit 1231 to notify that write data buffer 1224 is full.

In the description, when write data buffer 1224 becomes full, write buffer status detector 1228 produces a request suppression signal and a full signal. However, it is also possible that detector 1228 produces a full signal as follows. A predetermined value is beforehand set to detector 1228 such that when the count value of entry counter 1221 is equal to the value of detector 1228, detector 1228 produces a request suppression signal and a full signal. In this case, the value set to detector 1228 need only be equal to or less than the count value of entry counter 1221 when write data buffer 1224 is full.

In bus changeover unit 123, bus monitor unit 1232 controls historical information of read requests sent from write request and data successive transmitter 120 to apparatus B 200. In accordance with the history and the read data transfer notifying signal received via signal line 400 from apparatus B 200, it can be determined when read data is received via bus 300, i.e., when bus 300 is used for a read data transfer. Consequently, bus monitor 1232 recognizes a period of time in which bus 300 is not used for the read data transfer and sends a bus mastership grant signal via a signal line 126 to bus changeover unit 1231.

Even in a configuration in which apparatus B 200 does not send any read data transfer notifying signal, the operation above can be assumed. Namely, when a predetermined number of machine cycles determined by operation (time) of memory 260 lapse after monitor 1232 issues a read request, bus monitor 1232 receives read data via bus 300 from apparatus B 200. It is consequently possible that bus monitor 1232 recognizes a period of time in which bus 300 is not used for the read data transfer and sends a bus mastership grant signal via signal line 126 to bus changeover unit 1231.

Changeover unit 1231 calculates a logical product through an AND operation between the full signal from detector 1228 and the grant signal from monitor 1232. When the AND condition is satisfied, changeover unit 1231 transmits a bus changeover signal via a signal line 127 to enable a data transmission driver 1233.

Changeover unit 1231 acquires the bus mastership of bus 300 for the write data transfer and changes the data transfer direction of bus 300 to transfer write data. The system is resultantly prepared to transmit the write request, the address, and the associated write data from write data buffer 1224. Concurrently, changeover unit 1231 sends a write data transmission grant signal via a signal line 124c to decoder 1225 and an out pointer 1222.

In operation of pointer 1222, the write data transmission grant signal from changeover unit 1231 is delivered to a latch. Pointer 1222 includes a pointer value, which is incremented by a plus-one circuit, i.e., one is added to the pointer value at timing synchronized with a system internal clock signal and the obtained pointer value is sequentially kept in the latch. As a result, the pointer value from pointer 1222 is increased by one in synchronism with the system internal clock signal. The pointer value is sequentially decoded by a decoder 1226 and is passed to an output selector of write data buffer 1224. In the output selector, there is sequentially selected an output from a plane of buffer 1224 indicated by the pointer thus sequentially decoded. In consequence, the write request, the address, and the associated write data are read from the plane. The items obtained from buffer 1224 are fed via data transmission driver 1233 and bus 300 to apparatus B 200.

Decoder 1225 produces decode value "2" when a write data transmission grant signal is received from changeover unit 1231 as described above. In the selector of entry counter 1221, an output from the minus-one circuit, i.e., a value obtained by subtracting one from the count value of entry counter 1221 is selected to be kept in the latch in the lower stage. Decoder 1225 continuously outputs decode value "2" while the transmission grant signal is being received. In entry counter 1221, therefore, a value obtained by subtracting one from the value of counter 1221 in synchronism with the system internal clock signal is selected by the selector to be sequentially kept in the latch. Resultantly, the count value of counter 1221 is decreased by one at timing synchronized with the system internal clock signal. That is, the pointer value of pointer 1222 is sequentially increased such that the write request, the address, and the associated write data are accordingly read from write data buffer 1224. Each time these items are sent via bus 300, the count value of counter 1221 is decreased.

When write buffer status detector 1228 monitoring the count value of entry counter 1221 detects an event that the count value is zero, i.e., the write requests, the addresses, and the associated write data are completely read from write data buffer 1224, detector 1228 interrupts the request suppression signal being sent via signal line 125 and then transmits a request suppression release signal to read/write request issuing unit 100. Detector 1228 also sends an empty signal via a signal line 124b to bus changeover unit 1231 to notify that write data buffer 1224 is empty.

Having received the empty signal from detector 1228, changeover unit 1231 interrupts the bus changeover signal being sent via signal line 127 and disables data transmission driver 1233. Changeover unit 1231 releases the bus mastership of bus 300 and changes the transfer direction of bus 300 to transfer read data, namely, bus 300 is ready to transmit read data. Changeover unit 1231 interrupts the data transmission grant signal being sent via signal line 124c to terminate the subtraction of the counter value in entry counter 1221 and the update of the pointer value in pointer 1222.

Figure 3:
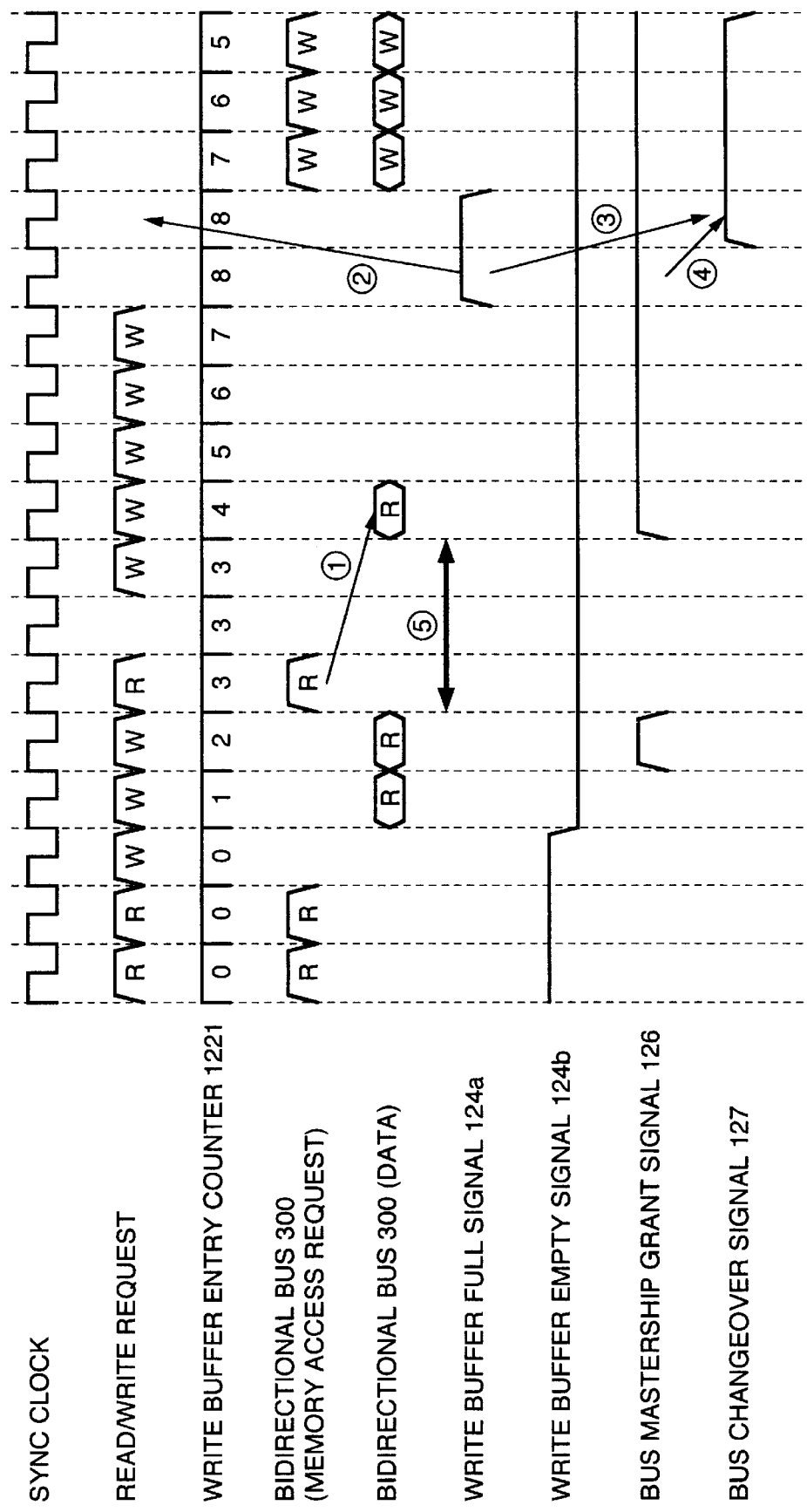
FIG. 3 is a signal timing chart showing an example of signal waveforms in the write request and data successive transmitter and the bidirectional bus.

FIG. 3 shows in a signal timing chart an example of signal waveforms in write request and data successive transmitter 120 and bidirectional bus 300.

In FIG. 3, it is assumed as indicated by ①, when three machine cycles lapse after transmitter 120 issues a read request via bus 300 to apparatus B 200, read data is transferred from apparatus B 200 via bus 300 to transmitter 120. Bus monitor 1232 can recognize when bus 300 is busy for a read data transfer and hence easily outputs a bus mastership grant signal for a write data transfer. In the example of FIG. 3, the bus mastership grant signal is suppressed in one machine cycle in which a read request is issued to apparatus B 200 and two subsequent machine cycles. In other machine cycles, the grant signal is outputted from bus monitor 1232.

It is assumed that one machine cycle is necessary to change the data transfer direction of bus 300.

In FIG. 3, when the count value of entry counter 1221 becomes eight, write buffer status detector 1228 outputs a full signal and a request suppression signal, not shown. As a result, read/write request issuing unit 100 stops issuing the read and write requests ②. In this situation, if the bus mastership grant signal is being outputted from bus monitor 1232, bus changeover unit 1231 outputs a bus changeover signal for write data (③ and ④) to change the data transfer direction of bus 300 for the write data transfer. When the count value of entry counter 1221 becomes zero, i.e., write data buffer 1224 is empty, write data buffer status detector 1228 outputs an empty signal. Bus changeover unit 1231 responsively interrupts the bus changeover signal and the data transfer direction of bus 300 is changed to transfer read data.

As described above, the accumulated write data can be transferred at a time.

In the example of FIG. 3, the full signal is not outputted during the machine cycles indicated by ⑤ even if bus 300 is not being used for a read data transfer. Consequently, for example, even when one or more write data is accumulated in write data buffer 1224, the write data cannot be transferred.

To overcome this difficulty, the condition for bus changeover unit 1231 to output the bus changeover signal is changed from the event in which the AND condition is satisfied between the full signal from detector 1228 and the bus mastership grant signal from monitor 1232 to an event of reception of the bus mastership grant signal from monitor 1232. Namely, only when the grant signal is received from bus monitor 1232, ok changeover unit 1231 outputs a bus changeover signal and the data transfer direction of bus 300 is changed. On this occasion, if one or more write data exists in buffer 1224 (three items of write data stored in FIGS. 3 and 4), the write data is read from buffer 1224 to be transferred via bus 300.

Through this operation, the write data can be transferred even during the period indicated by ⑤ in FIG. 3. This increases the availability ratio of bus 300 and the write data can be transmitted at an earlier point of time.

Figure 4:
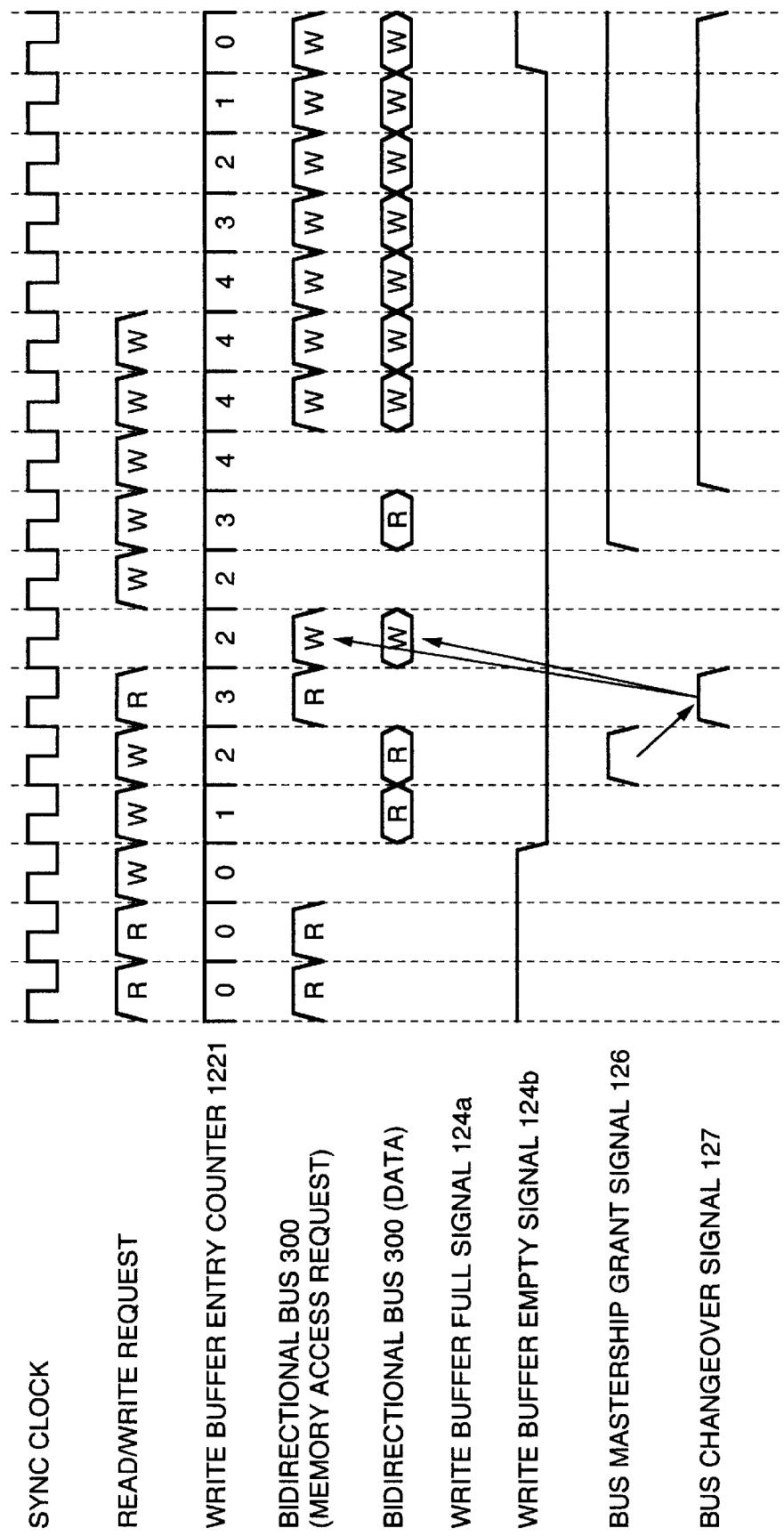
FIG. 4 is a signal timing chart showing another example of signal waveforms in the write request and data successive transmitter and the bidirectional bus.

In the description of FIGS. 3 and 4, operation of apparatus B 200 to output a read data transfer notifying signal on assumption that when a predetermined number of machine cycles lapse after a read request is issued from write request and data successive transmitter 120 to apparatus B 200, the read data is transferred from apparatus B 200 to transmitter 120. However, the present invention is also applicable even when the read data is transferred from apparatus B 200 when a predetermined number of machine cycles, e.g., three machine cycles lapse after the read data transfer notifying signal is transmitted. In this situation, bus monitor 1232 suppresses the bus mastership grant signal in the machine cycle in which the read request is issued to apparatus B 200 and in two cycles subsequent to the output of the read data transfer notifying signal from apparatus B 200. In the other machine cycles, bus monitor 1232 outputs the bus mastership grant signal. The other operations are the same as those described above.

Figure 5:
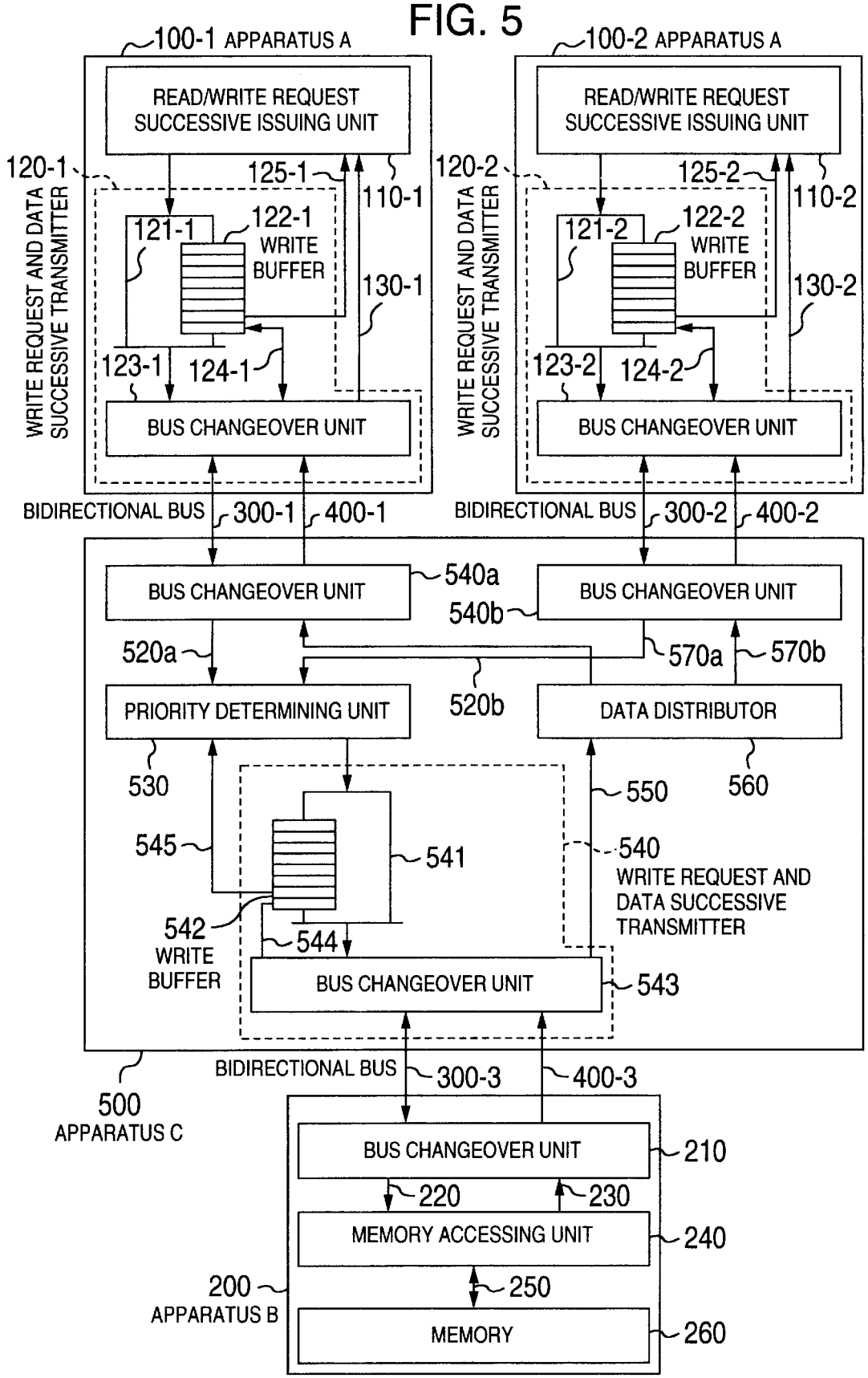
FIG. 5 is a block diagram showing constitution of another embodiment of a data processing system in accordance with the present invention.

FIG. 5 shows in a block diagram an alternative embodiment of a data processing system constructed by developing the system of FIG. 1.

The data processing system of FIG. 5 includes apparatuses A-1 100-1, A-2 100-2, B 200, and C 500. Apparatuses A-1 100-1 and A-2 100-2 are configured in substantially the same way as for apparatus A 100 of the system shown in FIG. 1. Apparatus B 200 is almost equal in constitution to apparatus B 200 of FIG. 1. Apparatus C 500 includes a bus changeover unit 540a for apparatus A-1 100-1, a bus changeover unit 540b for apparatus A-2 100-2, a priority determining unit 530 and a data distributor 560 which are connected to bus changeover units 540a and 540b, a write request and data successive transmitter 540 connected to priority determining unit 530 and data distributor 560. Transmitter 540 is substantially same as write request and data successive transmitter 120 of the system of FIG. 1. Priority determining unit 530 develops a function to determine which one of apparatuses A-1 100-1 and A-2 100-2 takes precedence in the processing of a read or write request issued therefrom to apparatus B 200. Data distributor 560 has a function to return read data from apparatus B 200 to an apparatus having issued a read request.

While data transfer interfaces respectively of apparatus A-1 100-1 and apparatus C 500 are connected via a bidirectional bus 300-1 to each other, data transfer interfaces respectively of apparatus A-2 100-2 and apparatus C 500 are linked via a bidirectional bus 300-2 with each other. These buses are substantially the same as bidirectional bus 300 of the system shown in FIG. 1. Between the respective apparatuses, signal lines 400-1 to 400-3 are arranged to transfer a read transfer notifying signal.

Operations of apparatuses A-1 100-1, A-2 100-2, and B 200 in this system, i.e., operations regarding read and write requests are almost the same as those of apparatuses A 100 and B 200 of the system of FIG. 1. In operation of apparatus C 500, a read request and/or a write request issued from apparatuses A-1 100-1 and A-2 100-2 are sent to priority determining unit 530. In accordance with priority determined by unit 530, the requests are transmitted to write request and data successive transmitter 540. For the requests, transmitter 540 conducts operation which is substantially equal to that of transmitter 120 of FIG. 1. This is also the case when read data is received from apparatus B 200. However, apparatus B 200 transfers information of a read request issuer to apparatus C 500 together with read data. The read data is sent via a bus changeover unit 543 and a signal line 550 to data distributor 560. Checking the read request issuer information added to the read data, data distributor 560 recognizes that the read request has been issued from apparatus A-1 100-1 or A-2 100-2 and then sends the read data to associated bus changeover unit 540a or 540b. The read data is accordingly transmitted via associated bus 300-1 or 300-2 to the apparatus having issued the read request.

It is also possible in this system to consecutively transfer a plurality of write data between apparatuses A-1 100-1 and C 500, between apparatuses A-2 100-2 and C 500, and between apparatuses B 200 and C 500 in almost the same way as described above.

In the description of the embodiments, apparatus A is assumed to include a CPU and apparatus B a memory. However, the present invention is not restricted by the combination but can be broadly applied to systems generally having a construction in which apparatuses to issue read and write requests are connected via a bidirectional bus to an apparatus which receives the read and write requests to conduct data transmitting and receiving operations.

In accordance with the embodiments of the present invention described above, in a system in which data transfer interfaces of different apparatuses are connected via a bidirectional bus to each other, when read data and write data are transferred between the apparatuses, the number of operations to change the transfer direction of the bus can be reduced by successively transferring a plurality of write data. This advantageously improves the availability ratio of the bidirectional bus.

In a state in which the bidirectional bus is not used for a read data transfer, the availability ratio of the bus can be much more improved by granting the bus mastership of the bidirectional bus for at least one write data transfer.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A data processing system, comprising:
   a first apparatus for issuing a data read request and a data write request;
   a second apparatus for executing the read and write requests from the first apparatus and transferring, for the read request, read data to the first apparatus; and
   a bidirectional bus connecting data transfer interfaces respectively of the first and second apparatuses to each other, wherein the first apparatus includes:
   a write buffer for accumulating therein write data associated with a write request to be issued to the second apparatus;
   a monitor unit for monitoring an operation status of the bidirectional bus and outputting a bus mastership grant signal when detecting an event that the bus is in an available state; and
   a permitting unit for permitting, when the bus mastership grant signal is being received from the monitor unit, an operation to successively transmit at least one write data accumulated in the write buffer to the bidirectional bus.

2. A data processing system in accordance with claim 1, wherein the permitting unit changes a data transfer direction of the bidirectional bus when the bus mastership grant signal is being received.

3. A data processing system in accordance with claim 1, wherein the first apparatus includes a detecting unit for detecting an event that a predetermined number of write data is accumulated in the write buffer and outputting a detection signal, wherein
   the permitting unit permits, when the detection signal is being received from the detecting unit and the bus mastership grant signal is being received from the monitor unit, an operation to successively transmit the predetermined number of write data accumulated in the write buffer to the bidirectional bus.

4. A data processing system in accordance with claim 3, wherein the detecting unit outputs, on detecting an event that the write buffer is full, the detection signal and outputs a suppression signal to suppress accumulation of another write data in the write buffer.

5. A data processing system in accordance with claim 3, wherein:
   the detecting unit detects, when the write data accumulated is being transmitted from the write buffer, an event that all write data is completely transmitted from the write buffer and outputs an empty signal; and
   the permitting unit interrupts, on receiving the empty signal, the permission of transmission.

6. A data processing system in accordance with claim 3, wherein the permitting unit permits, when the bus mastership grant signal is being received, transmission of at least one write data accumulated in the write buffer even if the detection signal is not being received and interrupts the permission of transmission when the reception of the bus mastership grant signal is interrupted.

7. A data processing system in accordance with claim 1, wherein the monitor unit recognizes, by receiving a read data transfer notifying signal transferred from the second apparatus before the second apparatus transmits read data, when the bidirectional bus is used by a transfer of the read data from the second apparatus.

8. A data processing system in accordance with claim 1, wherein the monitor unit recognizes, by monitoring the number of read requests issued from the second apparatus and points of issuing time of the respective read requests, when the bidirectional bus is used by a transfer of the read data from the second apparatus.

9. An apparatus comprising:
   a data transfer interface for issuing a data read request and a data write request to a partner apparatus connected via a bidirectional bus to the data transfer interface;

a write buffer for accumulating therein write data associated with a write request to be issued at least to the partner apparatus;

a monitor unit for monitoring an operation status of the bidirectional bus and outputting a bus mastership grant signal when detecting an event that the bus is in an available state; and a permitting unit for permitting, when the bus mastership grant signal is being received from the monitor unit, an operation to successively transmit at least one write data accumulated in the write buffer to the bidirectional bus.

10. An apparatus in accordance with claim 9, further including a detecting unit for detecting an event that a predetermined number of write data is accumulated in the write buffer and outputting a detection signal, wherein the permitting unit permits, when the detection signal is being received from the detecting unit and the bus mastership grant signal is being received from the monitor unit, an operation to successively transmit the predetermined number of write data accumulated in the write buffer to the bidirectional bus.

11. An apparatus in accordance with claim 10, wherein the detecting unit outputs, on detecting an event that the write buffer is full, the detection signal and outputs a suppression signal to suppress accumulation of another write data in the write buffer.

12. An apparatus in accordance with claim 10, wherein:

the detecting unit detects, when the write data accumulated is being transmitted from the write buffer, an event that all write data is completely transmitted from the write buffer and outputs an empty signal; and the permitting unit interrupts, on receiving the empty signal, the permission of transmission.

13. An apparatus in accordance with claim 10, wherein the permitting unit permits, when the bus mastership grant signal is being received, transmission of at least one write data accumulated in the write buffer even if the detection signal is not being received and interrupts the permission of transmission when the reception of the bus mastership grant signal is interrupted.

14. An apparatus in accordance with claim 9, wherein the monitor unit recognizes, by receiving a read data transfer notifying signal transferred from the partner apparatus before said another apparatus transmits read data, when the bidirectional bus is used by a transfer of the read data from the partner apparatus.

15. An apparatus in accordance with claim 9, wherein the monitor unit recognizes, by monitoring the number of read requests issued from the partner apparatus and points of issuing time of the respective read requests, when the bidirectional bus is used by a transfer of the read data from the partner apparatus.

16. A data transfer method for use with an apparatus of issuing a data read request and a data write request to a partner apparatus connected via a bidirectional bus thereto, comprising the steps of:

accumulating write data associated with a write request to be issued to the partner apparatus;

monitoring an operation status of the bidirectional bus; and successively transmitting, on detecting an event that the bidirectional bus is in an available state, at least one write data accumulated to the bidirectional bus.

17. A data transfer method in accordance with claim 16, further including the steps of:

detecting an event that a predetermined number of write data is accumulated; and successively transmitting on detecting an event that the bidirectional bus is in an available state, the predetermined number of write data accumulated to the bidirectional bus.

* * * * *